Feb. 14, 1939.　　　　S. DE ORLOW　　　　2,146,801
BUMPER GUARD
Filed May 20, 1938　　　4 Sheets-Sheet 1
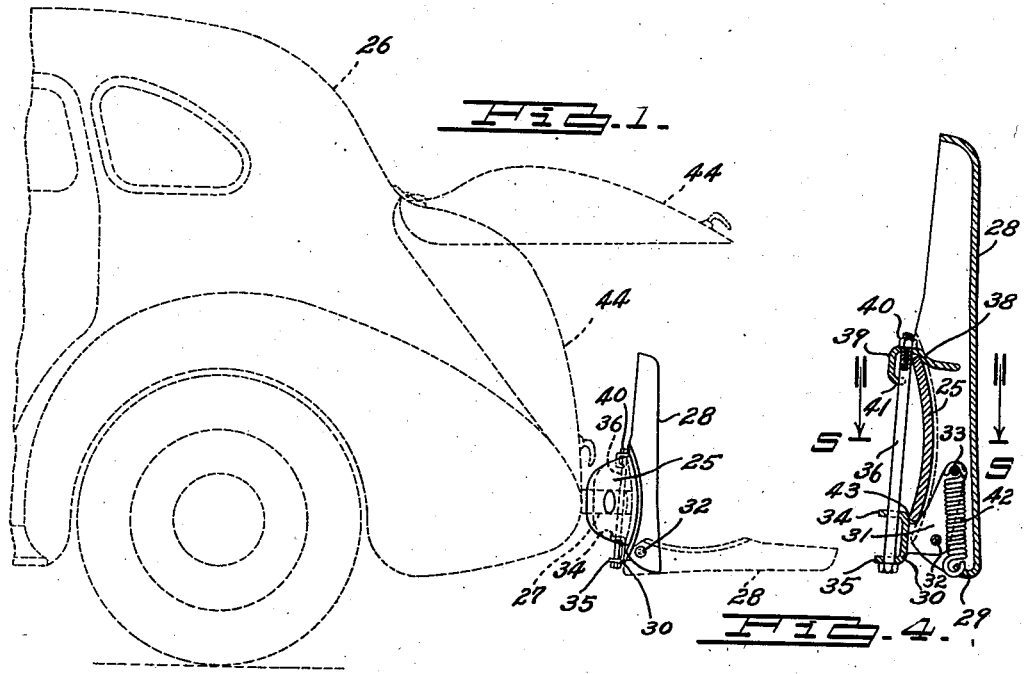
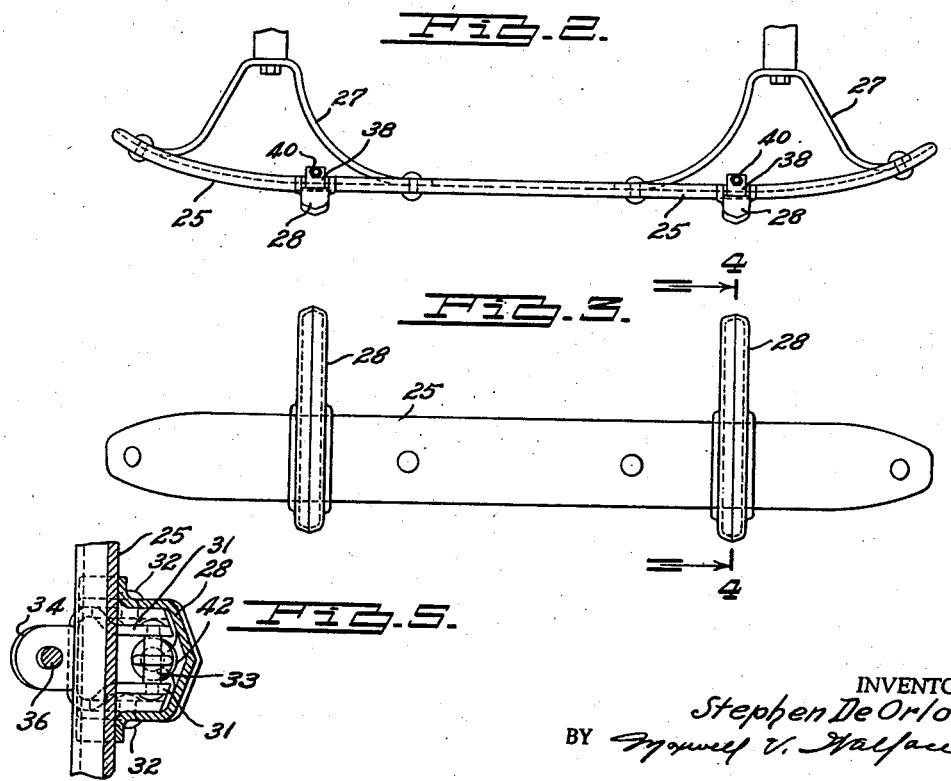
INVENTOR.
Stephen De Orlow
BY
ATTORNEY.

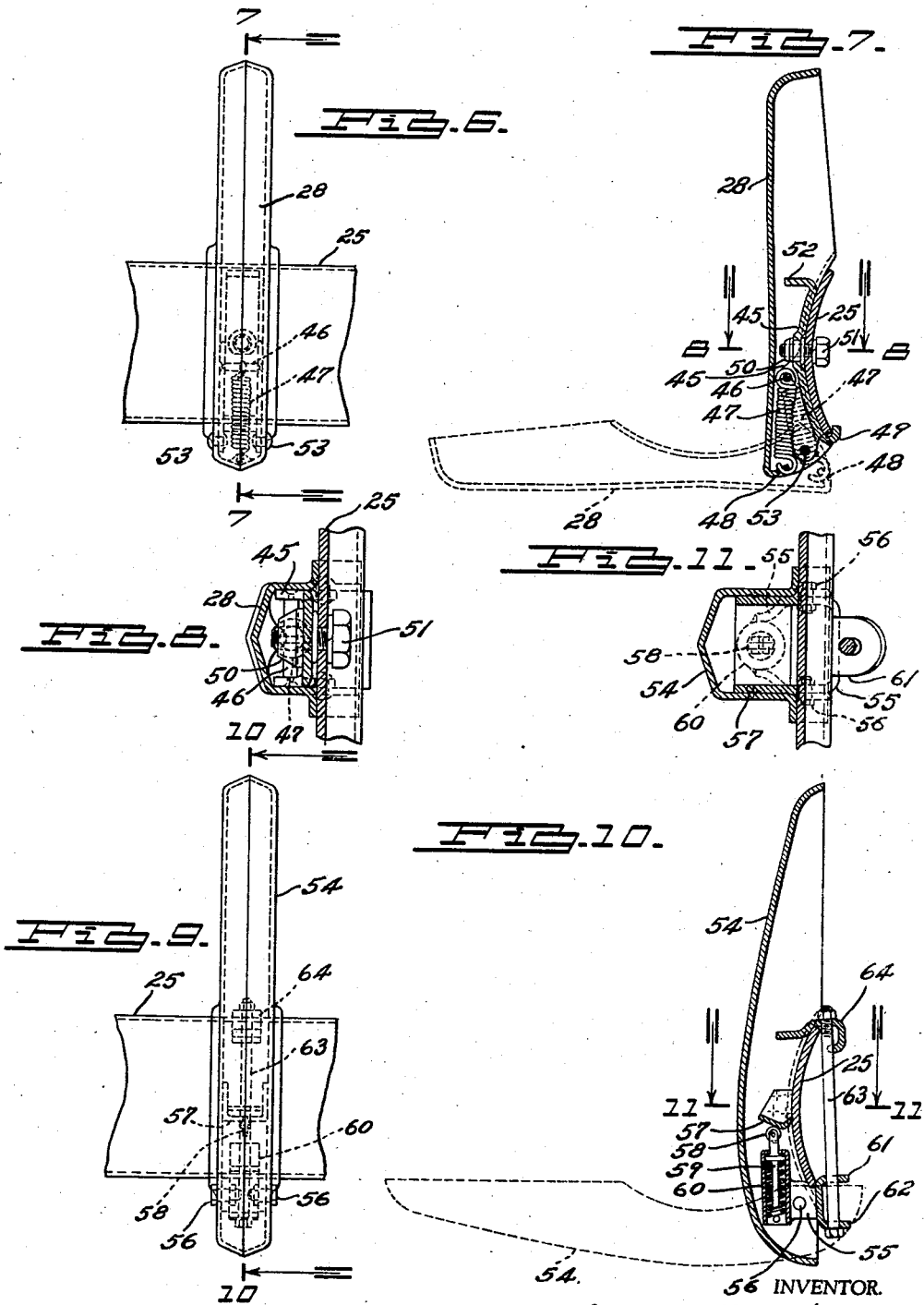

Feb. 14, 1939.    S. DE ORLOW    2,146,801
BUMPER GUARD
Filed May 20, 1938    4 Sheets-Sheet 3

INVENTOR.
Stephen De Orlow
BY
ATTORNEY.

Feb. 14, 1939.   S. DE ORLOW   2,146,801
BUMPER GUARD
Filed May 20, 1938   4 Sheets-Sheet 4
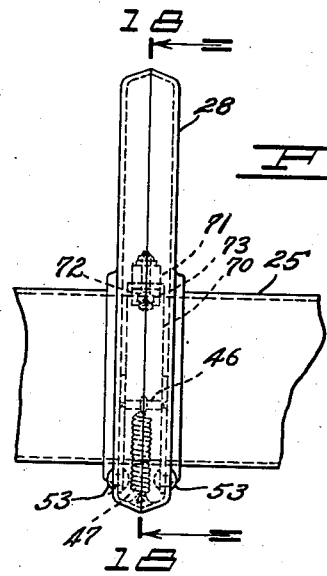
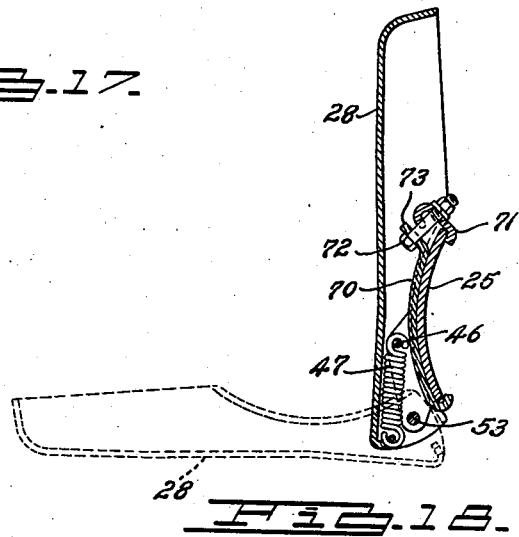
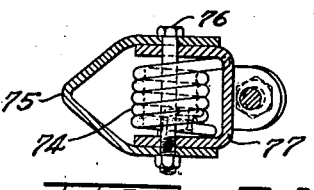
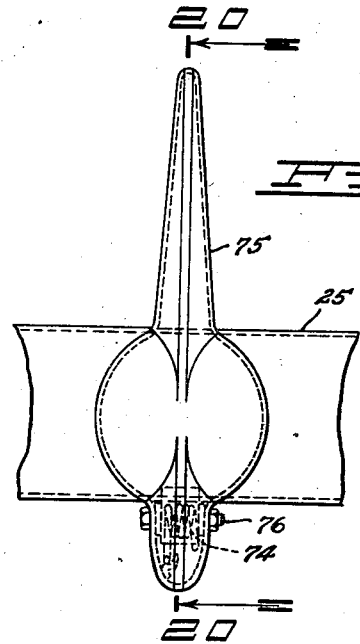
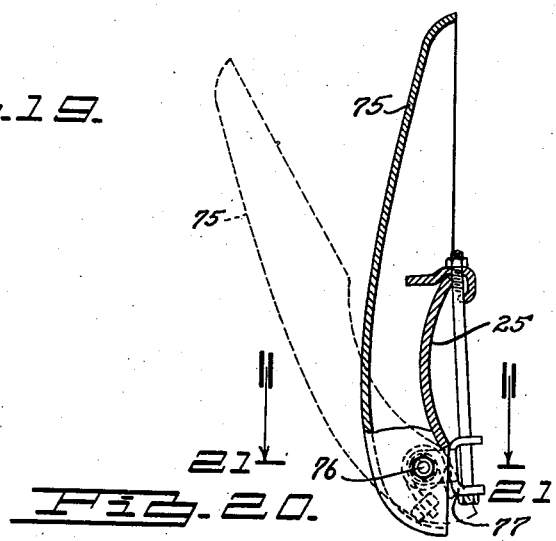
INVENTOR.
Stephen De Orlow
BY
ATTORNEY.

Patented Feb. 14, 1939

2,146,801

UNITED STATES PATENT OFFICE 2,146,801

BUMPER GUARD

Stephen De Orlow, Detroit, Mich.

Application May 20, 1938, Serial No. 209,056

7 Claims. (Cl. 293—55)

The present invention relates to an improved hinged spring loaded vehicle bumper guard for either the front or rear bumper of a vehicle. Detachable bumper guards have been used in the past, the same being applied to the bumper by means of bolts or clamps. This type of guard required the user to manually unscrew or unsnap the various attaching means in order to release the guard so that the same could be moved from a vertical to a horizontal position, or to remove the same entirely from the bumper. Bumper guards of the type herein disclosed are necessary owing to the fact that most vehicles today are parked in tandem and various makes of cars have the bumpers at various heights which in turn cause the interlocking of same and the passing of one bumper over or under another allowing the bumper of one vehicle to contact the body proper of another. Also the bumpers of modern vehicles are being placed much closer to the body proper than formerly, and when a bumper guard is added to the bumper it is impossible to move the rear deck lid from its closed to open position or from its open to closed position without entirely removing the bumper guard.

The principal object of the present invention is to provide a new and improved spring loaded bumper guard which may be detachably secured to a bumper and which may be manually moved from its normal vertical position to its open horizontal position without detaching the guard from the bumper.

Another object of the invention is to provide a new and improved spring loaded bumper guard containing means for preventing side movement of the guard.

A still further object is to provide a new and improved spring loaded bumper guard which will release itself from the bumper when the guard has become interlocked with the bumper or guard of another vehicle.

The above and other objects will appear more fully from the following more detailed description, and from the drawings, wherein Fig. 1 is a disclosure of an automobile in side elevation with the bumper guard shown in full lines in its normal position, and indicated by dotted outline to show its open or down position to allow the rear deck lid to be raised to its dotted line position;

Fig. 2 is a plan view of a bumper showing a pair of guards secured thereto;

Fig. 3 is a front elevation of a bumper showing a pair of guards secured thereto;

Fig. 4 is a section taken substantially on line 4—4 of Fig. 3;

Fig. 5 is a section taken substantially on line 5—5 of Fig. 4;

Fig. 6 is a front view of a modified form of my invention;

Fig. 7 is a section taken substantially on line 7—7 of Fig. 6;

Fig. 8 is a section taken substantially on line 8—8 of Fig. 7;

Fig. 9 is a front elevation of a bumper showing another modified form thereof;

Fig. 10 is a section taken substantially on line 10—10 of Fig. 9;

Fig. 11 is a section taken substantially on line 11—11 of Fig. 10;

Fig. 17 is a front elevation of another form of the invention;

Fig. 18 is a section taken substantially on line 18—18 of Fig. 17;

Fig. 19 is a front elevation of another type of bumper guard;

Fig. 20 is a section taken substantially on line 20—20 of Fig. 19;

Fig. 21 is a section taken substantially on line 21—21 of Fig. 20.

Figure 12:
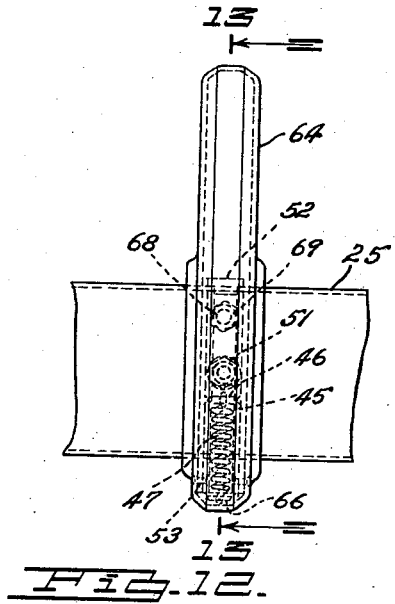
Fig. 12 is another form of bumper shown in front elevation.

Referring now to the drawings, numeral 25 designates a vehicle bumper of any well known shape or design, the same being secured to a vehicle 26 by means of securing brackets 27. Detachably secured to bumper 25 is my improved bumper guard, the same comprising an elongated guard member 28 and, as shown best in Figs. 1 and 4 of the drawings, being substantially U-shaped in cross section and having a spring securing means 29 formed integrally with and located adjacent the lower extremity of said guard 28. To secure the guard member 28 to bumper 25 and to allow the same to pivot therefrom there is provided a bumper securing means comprising a bracket 30 comprising a pair of opposed L-shaped members 31 pivoted within guard 28 by means of trunnions 32, the upper portion of the L-shaped securing means having therebetween a transverse spring holding bar 33. The lowermost portion of the bumper securing bracket 30 comprises a pair of laterally extending aligned ears 34, 35, the same being apertured to receive threaded holding bolt 36 which in turn passes through ears 34, 35 and is held in place by means of nut 40. The upper extremity of holding bolt 36 supports an apertured bumper securing means and guard wedge 38 said wedge being bent to form a hook 39. The wedge is apertured to receive holding bolt 36 and a nut 40 tends to hold wedge 38 tightly against the top edge of bumper 25. The hooked portion 39 of wedge 38 is turned under to form a flange 41, said flange being recessed to allow bolt 36 to rest therein. The flat front portion of wedge 38 is shaped and aligned to allow U-shaped guard portion 28 to pass thereover and fit neatly therein to prevent the side bending of guard 28, should the same receive a blow tending to bend it either to right or left of its normal vertical position, as shown in Figs. 1 and 4 of the drawings. Bumper bracket 30 is channeled as at 43 to form a seat for the lower edge of bumper 25. A heavy coil spring 42 connects guard securing means 29 and spring holding bar 33 in bumper securing bracket 30, the normal position of said spring 42 being that shown in Fig. 4 of the drawings.

The bumper guard may be attached at any convenient point on the bumper 25, or may be placed in spaced alignment on the bumper 25, as shown best in Figs. 2 and 3 of the drawings. To secure the guard to the bumper, the guard member 28 is broken and bent to its horizontal position shown in Fig. 1, nut 40 is removed, which in turn allows the removal of guard wedge 38. Holding bolt 36 is then passed under bumper 25 and raised until the lower edge of the bumper engages channel 43 in bumper securing bracket 30. Guard wedge 38 is then replaced over holding bolt 36 so that the upper edge of bumper 25 engages the same and the hooked portion 39 thereof engages holding post 36. Nut 40 is then screwed tightly onto holding post 36 and the guard is ready for use. Guards of the type disclosed herein are of such height and the bumpers are placed in such close proximity to the vehicle proper, that it is not possible to raise the rear deck cover 44 from its closed to open position, as shown in Fig. 1, unless guard 28 is moved from the vertical full-line position shown, to the horizontal dotted line position. Coil spring 42 tends to hold guard 28 in its vertical normal position, but when said guard is pulled outwardly from the bumper, the guard being pivotally secured as at 32 to bumper securing bracket 30, guard 28 passes pivot center of pivot 32 and pulls guard 28 to its horizontal position. Upon pulling upwardly on guard 28 spring 42 will pass by center of pivot 32, and pull guard 28 to its vertical normal position. Guard wedge 38 is adapted to not only secure the guard to the bumper proper, but the front portion thereof is so shaped that it engages the inner U-shaped portion of guard 28 and holds the same firmly against side movement, should the guard receive a blow which would in turn tend to bend it out of vertical alignment.

Figs. 6, 7 and 8 of the drawings disclose a modified form of the invention wherein guard member 28 is identical with that shown in Fig. 4 of the drawings, but the bumper securing bracket differs somewhat. As shown best in Fig. 7 of the drawings the bumper securing means comprises a bracket 45 which is formed in U-shape and through this U-shaped portion passes a pin 46 which in turn supports one end of a coil spring 47, the other extremity of which is secured to the lower portion of guard 28 as at 48. The lower end of bracket 45 is formed to provide a hook-shaped channel 49 adapted to receive the lower edge of bumper 25 and support the same. An additional bumper supporting means is provided in the shape of a clinch nut 50 which in turn receives a bolt 51 which passes through an opening in bumper 25. The upper portion of bracket 45 is turned as at 52 to form a wedge which performs the same function as that explained for wedge 38 shown in Fig. 4 of the drawings. Bracket 45 is also pivoted as at 53 to allow movement of guard 28 from the solid line position shown in Fig. 7 to the dotted line horizontal position, and also to allow spring 47 to pass by pivot points over center.

Figs. 9, 10 and 11 disclose another modified form of the invention wherein there is provided a guard 54 pivoted to bracket 55 as at 56. A cam 57 is secured to the inner surface of guard 54 and is adapted to engage a roller 58 rotatably secured to a spring loaded shaft 59 which is housed within a cylinder 60 which cylinder is secured to bracket 55. Bracket 55 also has formed thereon a pair of laterally aligned ears 61, 62 through which passes bolt 63, the upper end of which is adapted to receive a wedge securing plate 64 which performs a similar function to the plate shown in Fig. 4 of the drawings.

When it is desired to move guard 54 from its vertical normal position to its horizontal dotted-line position shown in Fig. 10 of the drawings, the guard must be pulled outwardly, the same being held normally against movement by means of cam 57 so formed to contact roller 58, which in turn is rotatably secured to spring pressed shaft 59 housed within cylinder 60, which in turn is secured to bracket 55. As guard 54 is moved outwardly, cam 57 is also moved until roller 58 passes over the hump-shaped portion thereof, after which guard 54 is free to fall to its horizontal dotted-line position, as shown in the drawings. When it is again returned to its vertical position, cam 57 engages wheel 58 and the cam guides the wheel to its pressure locking vertical position shown in the drawings.

Figure 13:
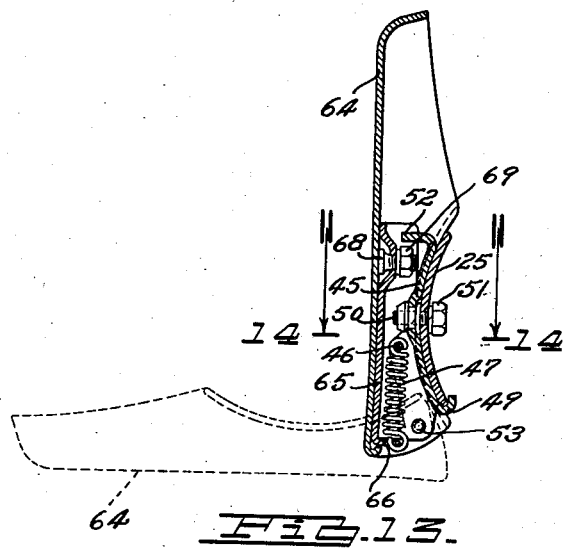
Fig. 13 is a section taken substantially on line 13—13 of Fig. 12.
Figure 15:
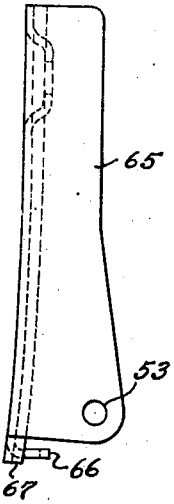
Figs. 15 and 16 are details of the spring retaining housing.
Figure 16:
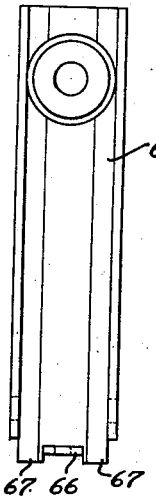
Figure 14:
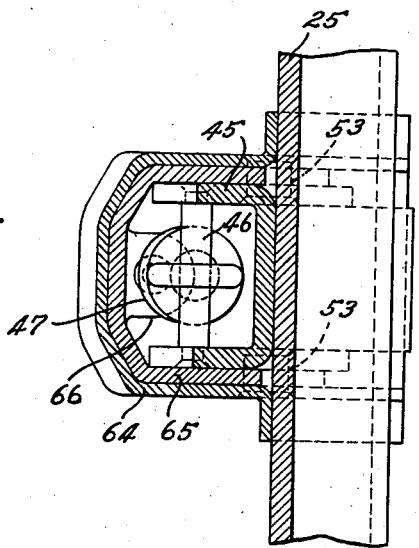
Fig. 14 is a section taken substantially on line 14—14 of Fig. 13.

Figs. 12, 13, 14, 15 and 16 disclose a still further modified form of the invention wherein the construction is quite similar to that shown in Fig. 7 of the drawings, with the exception that the guard member 64 is not supported directly on bumper securing means 45, but an additional or auxiliary U-shaped plate 65 is secured to bumper securing bracket 45 by means of pins 53. Spring 47 is secured at its lower extremity to U-plate 65 by means of a hook 66 formed integral with plate 65. The other extremity of spring 47 is secured to cross pin 46 which in turn is secured to bracket 45. Guard 64 is secured to U-shaped plate 65 by hooking the same to projections 67 and is bolted to U-plate 65 by means of bolt 68 and nut 69. U-shaped plate 65 is provided to eliminate hinging of guard 64 at pivots 53. U-shaped plate 65 does not necessarily have to be hooked and bolted to guard 64, but may be welded or built integrally with guard 64, thereby eliminating bolt and nut as shown in Fig. 13.

When opening guard 64 from its vertical to horizontal position, it will be seen that guard member 64 is not secured to bracket 45, but is secured to U-shaped plate 65 which in turn is hinged as at 53 to bracket 45.

Figs. 17 and 18 disclose another form of the invention quite similar to the construction shown in Fig. 7 of the drawings with the exception that bumper securing means 70 is not bolted through the center of bumper 25, but is secured thereto through means of a clip 71 formed in the shape of a hook so that it may be hooked over the top edge of bumper 25, securing the same thereto by means of bolt 72 which passes through clip 71 and connects lip 73 of bracket 70, which lip 73 also forms a wedge to engage the guard 28 and prevent side movement thereof when the guard is in its closed or vertical position.

Figs. 19, 20 and 21 disclose still another form of the invention wherein the guard member 75 is not moved from a vertical to horizontal position through an over-center spring member, but through means of a transverse torsional coil spring 74 supported on a cross member 76 which is a part of bracket 77. One extremity of cross spring 74 is compressed against the lower portion of guard 75 and the other extremity is compressed against the lower portion of bracket 77. The securing means for securing this type of guard to bumper 25 is similar to that shown in Fig. 4 of the drawings. This type of guard is pulled manually away from the vehicle to which it is attached just sufficiently to clear the back deck, or approximately to a 45° angle, instead of the 90° angle formed when the other types of guards are moved from their vertical to horizontal position. This movement against the torsional spring is just sufficient to allow the back-deck lid of the vehicle to pass beyond the bumper guard so that the lid may be opened or closed and when the guard is released, the same snaps back to its normal vertical position as shown best in Fig. 20 of the drawings.

There has been disclosed a new and unique spring loaded bumper guard, simple to manufacture, yet strong and durable. The strong coil spring used acts not only as a resilient means to snap the guard back into position, but when the guard is in its vertical or normal closed position, the coil spring acts as a closing or pressure means to keep the guard portion of the assembly in its closed position. The guard may be easily attached or secured to the bumper and once secured it is not necessary to unscrew nuts or bolts to move the guard member from its closed to open position. Should the user wish to remove the entire assembly from the bumper, but one nut need be removed and the guard may then be detached from the bumper. Should the guard receive forward pressure as when one car is pushing another, the guard member acts as a rigidly secured member, should the guard become interlocked with another guard or bumper the driver of the vehicle which has become interlocked need only back his vehicle and the spring in the guard allows the guard to open and free the locked member. If the guard should receive an angle thrust which would tend to bend the guard member out of alignment there is provided a wedge member which interlocks with the guard member and allows movement in but one direction, i. e., from the vertical to the horizontal.

While there is shown and described satisfactory constructional examples embodying the principles of the present invention, it will be understood that many changes, variations and modifications may be resorted to without departing from such principles.

I claim:

1. A device of the character described comprising, in combination, a substantially horizontal member extending transversely of a vehicle, a guard for said member, means for pivotally securing said guard to said horizontal member, resilient means connecting said guard and said pivotally securing means, a plate carried by said securing means and adapted to engage said horizontal member and said guard to prevent side movement of said guard, said pivotal and resilient means allowing movement of said guard from vertical closed position to horizontal open position.

2. A device of the character described for use in conjunction with a bumper comprising a guard member, a bracket for securing said guard member pivotally to said bumper, comprising a pair of spring retaining members and a pair of aligned ears formed integral therewith, a vertical securing means engaging said ears, a wedge member secured to said vertical securing means and so formed to engage said bumper and the interior of said guard to prevent side movement thereof, and a coil spring connecting said spring retaining members of said guard bracket and the lower extremity of said guard to allow movement of said guard from a vertical to a horizontal position.

3. A device of the character described for use in conjunction with a bumper, comprising a guard member, a bracket for securing said guard member pivotally to said bumper comprising a plate shaped to conform to the curvature of said bumper, to hold the plate and terminate in a wedge, spring retaining means built integral with said plate, means for securing said bracket to said bumper through the same, and a spring member connecting said spring retaining members of said guard bracket and said guard to allow movement of said guard from a vertical to a horizontal position.

4. A device of the character described comprising, in combination, a bumper, a guard member having a cam formed therein, a bracket for holding said bumper and securing said guard member pivotally thereto, said bracket having a pair of aligned ears built integral therewith and a housing containing a spring actuated shaft having a roller rotatably mounted thereon, said aligned ears supporting a vertical securing means adapted to support a wedge member for supporting said bumper and said guard, said roller engaging said cam to hold said guard in normal vertical position.

5. A device of the character described comprising, in combination, a bumper, a guard having the lower portion thereof rolled to form a hook, a securing housing formed to engage the hook of said guard, means for bolting said housing to said guard, a bracket for pivotally securing said housing to said bumper comprising a plate formed to receive said bumper and so shaped to conform to the curvature of the bumper and terminate in a wedge, means for securing said bracket to said bumper, and spring means connecting said housing and said bracket to allow movement of said guard from a vertical to a horizontal position.

6. A device of the character described comprising, in combination, a bumper, a guard member, a bracket for securing said guard to said bumper comprising a plate formed to receive the lower edge of said bumper and terminating in a lip, a plate adapted to engage the upper edge of said bumper, means for connecting said plate and said lip, and spring means connecting said bracket and said guard to allow movement of said guard from a vertical to a horizontal position.

7. A device of the character described comprising, in combination, a bumper, a guard member, a bracket for securing said guard to said bumper comprising a housing, a pair of aligned ears formed integral with said bracket, a vertical securing member engaging said ears, a wedge member secured to said vertical securing member adapted to engage said bumper and said guard to hold said guard against side movement, means for pivotally securing said bracket to said guard, spring means mounted on said pivotally securing means engaging said guard and said bracket to allow movement of said guard from its normal vertical position.

STEPHEN DE ORLOW.